United States Patent [19]

Sharp et al.

[11] 4,295,979

[45] * Oct. 20, 1981

[54] METHOD AND COMPOSITION FOR INHIBITING CORROSION IN HIGH TEMPERATURE, HIGH PRESSURE GAS WELLS

[75] Inventors: Shelby P. Sharp, Tulsa, Okla.; Lyman Yarborough, Naperville, Ill.

[73] Assignee: Standard Oil Company (Indiana), Chicago, Ill.

[*] Notice: The portion of the term of this patent subsequent to Feb. 3, 1998, has been disclaimed.

[21] Appl. No.: 43,521

[22] Filed: May 29, 1979

[51] Int. Cl.³ .............................................. C23F 11/00
[52] U.S. Cl. ........................... 252/8.55 E; 166/244 C; 252/391
[58] Field of Search ............... 252/8.55 B, 8.55 E; 166/312, 244 C; 299/4, 5

[56] References Cited

U.S. PATENT DOCUMENTS

| | | | |
|---|---|---|---|
| 2,598,213 | 5/1952 | Blair | 252/8.55 E |
| 3,531,160 | 9/1970 | Fisher | 299/5 |
| 3,623,979 | 11/1971 | Maddox et al. | 252/8.55 E |
| 3,687,847 | 8/1972 | Maddox et al. | 252/8.55 E |
| 3,846,311 | 11/1974 | Sharp et al. | 252/8.55 B |

OTHER PUBLICATIONS

Brown et al., Article in the *The Oil and Gas Journal*, vol. 57, No. 44, Oct. 26, 1959, pp. 73-78.

Tuttle et al., "Deep Wells—A Corrosion Engineering Challenge", Paper No. 94, presented at the International Corrosion Forum, Apr. 14-18, 1975 held at Toronto, Ontario.

*Primary Examiner*—Herbert B. Guynn

[57] ABSTRACT

A relatively nonvolatile, high molecular weight oil soluble corrosion inhibitor carrier produced by adding at least 40 parts by weight of elemental sulfur per 100 parts by weight dialkyl disulfide oil to an amine activated dialkyl disulfide oil which exhibits corrosion inhibition on its own and in combination with conventional oil based corrosion inhibitor additives. Such a carrier is particularly useful in sustaining a liquid film forming phase at bottomhole conditions for high temperature, high pressure gas wells wherein essentially no petroleum condensate phase exists.

5 Claims, 3 Drawing Figures

METHOD AND COMPOSITION FOR INHIBITING CORROSION IN HIGH TEMPERATURE, HIGH PRESSURE GAS WELLS

BACKGROUND OF THE INVENTION

1. Field of the Invention

The present invention relates to an improved corrosion inhibitor system and a method for using this corrosion inhibitor in gas wells. More specifically, it is concerned with an amine activated alkyl polysulfide oil optionally containing an oil-soluble corrosion inhibitor which is capable of maintaining a protective film at high temperature, high pressure bottomhole conditions in the absence of a petroleum condensate phase.

2. Description of Prior Art

The utilization of chemical corrosion inhibitors to protect metal surfaces in various stages of oil and gas production has long been recognized as a necessary feature of oil and gas production. During the past half century multitudes of chemical corrosion systems and methods of using them have been developed and have led to a vast number of patents and technical literature references. Thus, today, corrosion engineering is considered an integral part of the planning and operation of virtually every stage of oil and gas production.

With ever increasing world energy demands and the advent of international fuel shortages, the oil and gas industry has been forced to drill deeper and deeper into more hostile environments in search of the critically needed fuel. As a result, certain high temperature, high pressure deep horizon gas fields have been discovered throughout the world, which present a severe challenge to contemporary corrosion technology when one attempts to produce large volumes of natural gas from these fields.

The gas wells of particular interest in the present invention are characterized by a combination of properties that lead to corrosion rates many fold higher than experienced in other gas fields. First and foremost, the gas wells are completed at great depths which in many cases exceed 20,000 feet. Consequently, the gas wells are categorically high temperature, high pressure wells. As a general rule of thumb at bottomhole temperatures in excess of 250° F. and bottomhole pressures of the order of about 4,000 psi, one can anticipate severe corrosion. As these bottomhole temperatures and pressures increase, the problem becomes even more pronounced such that at about 400° F. and pressures in excess of 5,000 psi, the use of many corrosion inhibiting systems and methods is virtually prohibited. The gas wells of interest in the present invention are of this nature.

Furthermore, the particular gas wells of interest are dry wells in the sense that no liquid petroleum phase exists at the bottomhole conditions. Thus no protective oil film will be present to coat the casing and to act as a corrosion inhibitor carrier. In fact, since no condensate phase exists at these bottomhole conditions, injection of oil-soluble inhibitors in a petroleum condensate carrier will be ineffective because of premature vaporization of the carrier before reaching the bottom of the well.

To further complicate the lack of a petroleum condensate phase at the bottomhole conditions, the gas wells of interest will have an aqueous or brine phase present, and this, in combination with acid gases such as hydrogen sulfide, carbon dioxide or the like, create an extremely corrosive environment. With gas production in terms of tens of millions of standard cubic feet per day, the possibility of maintaining an oil condensate phase at bottomhole conditions is for all pragmatic purposes ruled out.

In an article entitled "Deep Wells—A Corrosion Engineering Challenge," by R. N. Tuttle and T. W. Hamby, presented at the International Corrosion Forum, Apr. 14-18, 1975, held at Toronto, Ontario, it was acknowledged that recent emphasis of deep high temperature, high pressure horizons as potential gas producers and the associated hostile environments encountered presents a severe challenge to contemporary technology. In the article it was pointed out that bottomhole temperatures as high as 550° F. have been encountered in south Texas, and bottomhole pressures exceeding 22,000 psi are present in Mississippi. It was also pointed out that tubing failure caused by corrosion in deep wells has been experienced in as little as eight months in the Lacq Field in France, Germany, Austria, and also Mississippi. The Thomasville-Piney Woods Field near Jackson, Miss., is exemplified as involving gas wells that fit the above description and have severe corrosion problems. The False River field in Louisiana is believed to contain gas wells that would have bottomhole conditions characteristics of the present invention. The article concludes with an admission that a new corrosion inhibiting system to cover flowing conditions in the range of 18,000 to 20,000 psi and 380° to 450° F. is needed for completion of anticipated future wells in south Texas and Mississippi.

SUMMARY OF THE INVENTION

In view of the severe corrosion problems encountered in gas wells producing from very deep high pressure and high temperature horizons wherein no petroleum condensate phase exist at bottomhole conditions but an aqueous or brine phase is present, we have developed a method for inhibiting corrosion in such wells involving the steps of:

(a) adding up to about 27 parts by weight of an alkyl amine per 100 parts per weight of an dialkyl disulfide oil producing an amine activated dialkyl disulfide solvent, (b) adding to said activated dialkyl disulfide solvent at least 40 parts by weight elemental sulfur per 100 parts by weight dialkyl disulfide oil producing a corrosion inhibitor carrier capable of existing in a liquid phase at bottomhole conditions at said high temperature, high pressure gas well, (c) injecting said corrosion inhibitor carrier into said gas well to inhibit corrosion.

In one aspect of the invention a small but effective amount of an oil soluble or oil compatible corrosion inhibitor is added to the corrosion inhibitor carrier prior to injecting into the gas well. In another aspect, the present invention provides a new corrosion inhibiting composition effective in maintaining a protective film at hostile bottomhole conditions. The corrosion inhibiting composition involves an amine activated alkyl polysulfide oil as a carrier, consisting of up to about 27 parts by weight of a lower alkyl amine and at least about 40 parts by weight of dissolved elemental sulfur per 100 parts of a dialkyl disulfide oil. In preparing the amine activated alkyl polysulfide for specified downhole conditions, the amount of elemental sulfur can be increased in order to decrease volatility such as to insure the presence of a liquid film forming phase. An effective amount of an oil soluble corrosion inhibitor can be incorporated into the alkyl polysulfide oil to produce new inhibiting composition. In another aspect of the present invention, the desired effective amount of corrosion inhibition is, at least in part, incorporated into the amine activated alkyl polysulfide oil by intentionally selecting the amine activator such that it has a corrosion inhibiting moiety that becomes part of the final polysulfide.

Thus, the primary objective of the present invention is to provide a new film forming heavy oil wherein the volatility of the oil can be tailored according to the needs of the particular gas wells to be treated and which is compatible with conventional oil base corrosion inhibitors such that injection of small volumes of heavy oil/inhibitor into the gas well wherein a petroleum condensate phase does not exist will result in a protective corrosion inhibiting liquid phase. In other words, the primary objective of the present invention is to provide an alternate corrosion inhibitor carrier that will perform in high temperature, high pressure gas wells without condensate in a manner analogous to the performance of an oil condensate/inhibitor system in a gas well containing a liquid petroleum phase.

DESCRIPTION OF THE PREFERRED EMBODIMENTS

Upon recognition of the severe corrosion problems associated with the aforementioned types of gas wells and the realization that the lack of a protective film forming condensate phase at bottomhole conditions is the cause of the problems, only a limited number of alternatives are available aside from capping the well and stopping production. Each of these alternatives is in some way less than fully acceptable. Since there is an aqueous phase present at bottomhole conditions, the use of a water soluble corrosion inhibitor is one alternative. However, the protective film forming characteristics of an aqueous phase is acknowledged as inferior to that of an oil film, and this in combination with high gas flow rates characteristically in excess of 10 MMSCFD makes the use of a water corrosion inhibitor system ineffective. Since the oil condensate phase is nonexistent at bottomhole conditions, conventional addition of an oil soluble corrosion inhibitor dissolved in an oil carrier is virtually impossible. However, overdisplacing the gas well with large volumes of oil containing an oil based inhibitor is another alternative. Such an alternative is expensive in that very large volumes are required which in turn reduce gas production rate and required expensive oversize equipment to achieve the necessary injection rates. Less volatile heavier oils have been employed in the overdisplacement technique to partially offset the extremely large volumes. It has also been suggested that more expensive exotic noncorrosive metals be employed. And more frequent pulling and replacement of production tubing has been implemented. But as of now, none of the alternatives or combinations of alternatives have proven to be equivalent of what would be expected if an oil condensate phase could be maintained at bottomhole conditions. The previously referenced R. N. Tuttle, et al, article summarizes an ideal solution to the problem in the following way, "A simpler approach would be to use a heavy oil which would provide a high dew-point pressure at low concentrations in the mixed gas/oil inhibitor phase (if one can be found)."

The present invention is such a system. We have discovered that when a lower alkyl amine is used to activate a dialkyl disulfide sulfur solvent and sufficient sulfur is then incorporated into this solvent, a heavy (alkyl polysulfide) oil results which is capable of existing in the liquid phase at bottomhole conditions characteristic of the dry gas wells of interest. This heavy oil is found to be an effective oil based corrosion inhibitor carrier with excellent film forming properties, thus, making it extremely useful in suppressing corrosion in these hostile environments. It is believed that both the alkyl amine and the dissolved sulfur are chemically bound to the dialkyl disulfide thus creating the desired high molecular weight and associated low volatility. Consequently, a liquid phase is observed at high temperature and high pressure in the presence of high gas flow rate even though relatively small quantities of the corrosion carrier is being employed. By selecting the amount of dissolved sulfur, the degree of volatility can be controlled and the composition can be tailored to the needs of the particular gas well, thus, insuring the presence of a liquid film forming phase at bottomhole conditions.

The alkyl polysulfide oil (the heavy oil) being employed as a corrosion inhibitor carrier is the reaction product resulting from dissolving relatively large quantities of elemental sulfur in certain known dialkyl disulfide sulfur solvents. For purposes of the present invention, the term alkyl disulfide should be considered equivalent to the term dialkyl disulfide and are used interchangeably. The known alkyl sulfide and disulfide sulfur solvents used in preparing the corrosion inhibitor carrier can be found (for example) in U.S. Pat. No. 3,531,160 and U.S. Pat. No. 3,846,311. The disulfide is the preferred form. At ambient conditions, they are liquid dialkyl disulfides and includes such compounds as dimethyl disulfide, diethyl disulfide, dioctyl disulfide, ditertiary tetradecyl disulfide, and the like. One particularly useful starting material is a mixture of aliphatic disulfides in which the aliphatic group therein contains from about 2 to about 11 carbon atoms, e.g., $(C_2H_5S)_2$, $(C_{11}H_{23}S)_2$, etc., typically those disulfide mixtures produced as a product stream of the Merox process described in *The Oil and Gas Journal,* Vol 57, pp. 73–78, Oct. 26, 1959. Briefly, such mixtures of disulfides are produced by first contacting a refinery hydrocarbon stream containing aliphatic mercaptans with a caustic solution to produce corresponding sodium salt of the mercaptans. The latter are then converted to dialkyl disulfides by air oxidation, simultaneously regenerating the caustic.

In order to enhance the formation of the desired alkyl polysulfide oil, a small effective amount of an amine catalyst or solvent activator is added to the liquid dialkyl disulfide. This addition of the amine in order to enhance the sulfur solvency properties of the dialkyl disulfide can be accomplished by any of the well known methods found in the art, including the method described in U.S. Pat. No. 3,846,311, except the necessity of the aging step is viewed as being optional. Also, as indicated in the U.S. Pat. No. 3,846,311, the aliphatic unsubstituted amines are believed to be uniquely suitable for activating the dialkyl disulfide. The normally liquid lower aliphatic amines of about 4 to 12 carbon atoms were found to be preferred when employed at a concentration of up to about 10 weight percent based on the weight of the dialkyl disulfide. Although the normally liquid lower aliphatic amines are the most convenient to handle, we have now found that higher molecular weight, easily melted, fatty amines and in particular, a group of N-alkyl-1, 3-propane diamines are functionally equivalent and can be used to produce the desired amine activated dialkyl disulfide. It is also believed that the normally gaseous alkyl amines are functionally equivalent provided they are maintained in contact with the dialkyl disulfide for a sufficient time to be chemically incorporated into the dialkyl disulfide according to what now appears to be a specific chemical reaction common to all predominantly aliphatic amines and dialkyl disulfides. By monitoring the vapor pressure of a relatively volatile amine during the amine activation of the dialkyl disulfide (e.g., diethylamine) and by repeating this measurement at incrementally increasing quantities of amine, it has been observed that an apparent 2 mols of dialkyl disulfide per 1 mol of nitrogen amine is the upper stoichiometric quantity of amine being chemically incorporated into the amine activated dialkyl disulfide sulfur solvent. Under previous conditions, when using the lowest molecular weight aliphatic amines, this upper stoichiometric ratio roughly corresponds to 10% by weight amine as acknowledged in the previous patent literature. It has now been found that achieving full stoichiometric incorporation of amine nitrogen is preferred and consequently, values in excess of 10 parts by weight amine per 100 parts by weight dialkyl disulfide are useful with values frequently being as high as 20 to about 27 parts by weight amine. In situations in which very high sulfur solubility is desired, even higher concentrations of amine can be employed. In such cases, the additional amine not only enhances the amounts of sulfur incorporated into the polysulfide oil, but appears to enhance the corrosion inhibition properties of the resulting polysulfide oil. In preparing the activated dialkyl disulfide sulfur solvent, the amine catalyst can be added directly to the dialkyl disulfide and the mixture used immediately to dissolve sulfur, thus forming the desired alkyl polysulfide oil. Alternately, the amine/dialkyl disulfide mixture can be aged according to the procedure found in U.S. Pat. No. 3,846,311, thus enhancing the solubility of elemental sulfur. In situations where very high sulfur content is desired (e.g., in very high temperature, very high pressure gas wells wherein high molecular weight and/or very low volatility is required), the aged amine activated dialkyl disulfide sulfur solvent is preferred. However, both the aged and the unaged are useful in the present invention.

Having activated the dialkyl disulfide oil by the addition of an amine, the desired alkyl polysulfide oil is then prepared by dissolving elemental sulfur in the amine activated disulfide oil. The solubility and the rate of dissolution of the sulfur in the dialkyl disulfide/amine mixtures varies somewhat with the source of the sulfur, its particular physical state and degree of pulverization. However, any elemental free sulfur is acceptable for purposes of this invention. The dissolution processes can be performed by conventional techniques with mild heating and agitation being advantageously employed. The specific amount of sulfur to be dissolved will vary according to the needs of the particular gas well to be treated. In principle, the more severe the bottomhole conditions, the greater the sulfur content. It has been our experience that significant liquid phase at bottomhole conditions can be achieved with as little as about 40 to 60 parts by weight sulfur per 100 parts by weight dialkyl disulfide with 80 parts by weight sulfur per 100 parts by weight dialkyl disulfide being particularly useful in that the resulting solution is easily handled, stored, and transported at ambient conditions without appreciable sulfur precipitation or excessive viscosities and solidification. Although the higher sulfur concentrations are preferred (60 and 80) because of their enhanced abilities to form the necessary film-forming phase, in situations involving cold environments or during cold periods of the year the intentional preparation and injection of the 40 parts by weight sulfur oil may be necessary. In such cases the addition of sulfur at the well may be appropriate depending on the downhole conditions. If the well of interest happens to involve sour gas and sulfur deposits, the inherent addition incorporation of sulfur in situ can be used advantageously to achieve the more optimum higher sulfur contents. Furthermore, high concentrations of sulfur ($>80$) are compatible with the present invention and may be necessary in extremely hostile downhole conditions. In such cases, any solidification or handling problems can be alleviated by working at higher temperatures. Literature references document cases wherein over 500 grams of sulfur per 100 grams of dialkyl disulfide have been achieved.

It is felt that the presence of the liquid alkyl polysulfide phase in the presence of high flow rate sour dry gas at high temperatures and high pressures is critical to successful corrosion inhibition. In order to confirm the presence of the desired liquid phase at bottomhole conditions, a series of phase distribution tests in a variable volume windowed PVT cell were performed. Table I presents the data related to the preparation of the various alkyl polysulfide oils used during such tests.

TABLE I

| | Preparation of Alkyl Polysulfide Oil | | | | | | |
|---|---|---|---|---|---|---|---|
| Sample | Weight of Fresh Disulfide Oil gms | Weight of Diethylamine, gms | Weight of Age Activated Disulfide oil, gms | Weight of Pulverized Sulfur, gms | Maximum Temperature Mixture Heated To Dissolve Sulfur With Occasional Shaking, °F. | Quantity of Sulfur Residue Present When Mixture Cooled To Room Temperature (74° F.), gms | Pour Point of Mixture After Cooling To Room Temperature, °F. |
| 1 | 100 | 7.1 | — | 80 | 190 | 0 | <10 |
| 2 | 100 | 7.1 | — | 90 | 200 | 1 | <10 |
| 3 | — | — | 100 | 90 | 200 | 0 | <10 |
| 4 | — | — | 100 | 100 | 190 | 0 | — |
| 5 | — | — | 100 | 110 | 200 | 0 | <10 |

In preparing the five samples, the first two were made by adding 7.1 grams of diethylamine to 100 grams of Merox disulfide oil. The pulverized sulfur was then added to this fresh, activated Merox solution without any appreciable aging. The other three were prepared by starting with aliquotes of a Merox/diethylamine mixture which had already been aged according to the procedure in U.S. Pat. No. 3,846,311. To these aged samples were added pulverized elemental sulfur. In all cases, the sulfur dissolution is performed by heating and occasional shaking. Upon cooling to room temperature, only Sample No. 2 showed a slight tendency for sulfur precipitation. Thus, the solution should be compatible with conventional bulk handling procedures at most ambient temperatures as previously mentioned. In regards to this property, the data also indicates that the aged samples relative to the fresh samples were capable of incorporating higher concentrations of sulfur without showing any tendency to precipitate at room temperature. Of the samples tested, all showed pour points below 10° F. At extreme conditions and a higher sulfur concentrations, temperature control by a way of steam jacketing, external or internal heating, insulation and the like may be necessary during preparation and handling. Thus for convenience about 80 grams of sulfur per 100 grams of disulfide is viewed as being preferable, but higher concentrations may be necessary, particularly in ultra high temperature and pressure sour gas wells.

The first and the last samples as presented in TABLE I were selected for testing in the presence of a sour dry gas in a high pressure variable volume PVT windowed cell at 285° F. (141° C.). The first amine activated alkyl polysulfide oil tested was prepared by first adding 7.1 grams of diethylamine to 100 grams of fresh Merox disulfide oil. Then 80 grams of pulverized sulfur was dissolved into this dialkyl disulfide oil under mild heating of up to 190° F. (88° C.) with gentle stirring. For purposes of this invention, we shall refer to this type of sample as an "unaged" or "fresh" solvent. After cooling the fresh solvent back to room temperature of about 75° F. (24° C.), at 10 cc aliquot of the solvent was placed in the variable volume windowed cell and 2 gm mols (47 grams) of a sour dry gas having a composition as shown in TABLE II was injected at 1500 psi into the same cell.

TABLE II

| Component | Mol % |
|---|---|
| $N_2$ | 4 |
| $CH_4$ | 62 |
| $CO_2$ | 9 |
| $H_2S$ | 25 |

This particular composition corresponds to 37.4 barrels of alkyl polysulfide oil being injected into the sour gas well per million standard cubic feet of sour gas being produced from the well (Bbl/MMSCF). The cell was held at 285° F. (141° C.) while the volume was varied such that the pressure in the cell ranged from approximately 1,000 to 8,200 psia. The total volume of the cell and the volume of the liquid phase present in the cell were recorded at various pressures and are presented in TABLE III and FIG. 1.

TABLE III

Phase Distribution Test Results for Fresh Amine Activated Polysulfide Oil with Sour Gas at 285° F.

| Pressure, psia | Total Volume, cc | Liquid Volume, cc | Volume Liquid at Temperature and Pressure per Volume Polysulfide Oil |
|---|---|---|---|
| 37.4 Bbl Oil/MMSCF Sour Gas | | | |
| 1,016 | 931.34 | 8.4 | 0.84 |
| 1,702 | 539.41 | 8.5 | 0.85 |
| 2,359 | 384.12 | 8.15 | 0.815 |
| 3,050 | 296.68 | 7.8 | 0.78 |
| 4,063 | 228.04 | 6.5 | 0.65 |
| 4,567 | 207.20 | 6.4 | 0.64 |
| 5,190 | 188.07 | 5.6 | 0.56 |
| 6,175 | 167.40 | 5.0 | 0.50 |
| 7,238 | 152.60 | 4.5 | 0.45 |
| 8,202 | 23.10 | 4.35 | 0.435 |
| 15.8 Bbl Oil/MMSCF Sour Gas | | | |
| 1,662 | 1,321.64 | 6.0 | 0.60 |

As indicated in the third column of TABLE III, a liquid phase was present throughout the entire pressure range. The fourth column represents the ratio of volume of liquid at the specified temperature and pressure per volume of polysulfide oil injected. Such data are of practical importance for designing a commercial well treatment in that it reflects the relative volume of liquid phase remaining at various pressures (depths) in the well when 37.4 barrels of oil are injected per MMSCF of sour gas produced; e.g., at 8,000 psia approximately 44% of the volume injected is the volume of the liquid state at well conditions. At the end of the phase distribution measurements, the cell was returned to the lower end of the pressure range and an additional 2.7 gm mols (63.5 grams) of sour gas was injected such as to produce a composition ratio of 15.8 Bbl/MMSCF. After taking one data point, a seal in the windowed cell failed, aborting the test. This additional data point is included in TABLE III and FIG. 1. Although there is only one measurement at the 15.8 Bbl/MMSCF composition ratio, it does establish that significant liquid phase exists (at least at one pressure) and quantitatively implies that reducing the quantity of liquid injected by a factor of over ½ still produces a significant amount of the desired liquid phase at downhole conditions.

A second phase distribution test was performed using an aged amine activated dialkyl disulfide oil prepared according to the procedure found in U.S. Pat. No. 3,846,311. To a 100 gram sample of the aged diethylamine activated dialkyl disulfide oil (Merox mixture) was added 110 grams of pulverized sulfur (See Sample 5, TABLE I). The mixture was heated to about 200° F. (93.3° C.) with occasional stirring until the sulfur dissolved. After cooling back to room temperature, 75° F. (24° C.), a 1.90 cc aliquot was placed in the variable volume windowed cell along with 4.55 gm mols of sour gas injected at 1,110 psia (a ratio of 3.14 Bbl/MMSCF). Again, the volume of the cell was varied such that the pressure ranged from about 1,800 psia to over 7,000 psia. Data related to the total volume and the volume of liquid at various pressures are presented in TABLE IV. Again, significant liquid phase was observed across the entire pressure range. After completing the phase distribution measurements, the windowed cell was returned to the lower portion of the pressure range and additional aged activated alkyl polysulfide (1.90 cc at 75° F. and 1900 psi) was injected into the cell, thus simulating a ratio of 6.28 Bbl/MMSCF. The phase distribution measurements were repeated at this higher alkyl polysulfide oil concentration, and the respective data are presented in Table IV and FIG. 2. At the completion of these measurements, the PVT windowed cell was cooled to 113° F. (45° C.) and two additional data points were measured. These two latter data points are descriptive of the anticipated conditions typical of a separator located downstream of the wellhead of the sour gas well being modeled. These data are also presented in TABLE IV and FIG. 2.

TABLE IV

Phase Distribution Test Results for Aged Activated Alkyl Polysulfide Oil With Sour Gas

| Pressure, psia | Total Volume, cc | Liquid Volume, cc | Volume Liquid at Temperature and Pressure per Volume Polysulfide Oil |
|---|---|---|---|
| 3.14 Bbl Oil/MMSCF Sour Gas at 285° F. | | | |
| 1,845 | 1,127.64 | 0.8 | 0.421 |
| 3,050 | 679.40 | 0.73 | 0.384 |
| 4,120 | 577.07 | 0.65 | 0.342 |
| 5,144 | 432.05 | 0.65 | 0.342 |
| 6,176 | 379.28 | 0.7 | 0.368 |
| 7,244 | 342.86 | 0.7 | 0.368 |
| 6.28 Bbl Oil/MMSCF Sour Gas at 285° F. | | | |
| 1,859 | 1,129.72 | 1.9 | 0.500 |
| 3,073 | 679.19 | 1.75 | 0.461 |
| 4,063 | 524.15 | 1.7 | 0.447 |
| 5,057 | 439.13 | 1.55 | 0.408 |
| 6,093 | 384.74 | 1.4 | 0.368 |
| 7,024 | 372.87 | 1.4 | 0.368 |
| 1,112 | 1,313.66 | 3.3 | 0.868 |
| 1,643 | 821.5 | 3.1 | 0.816 |

Figure 2:
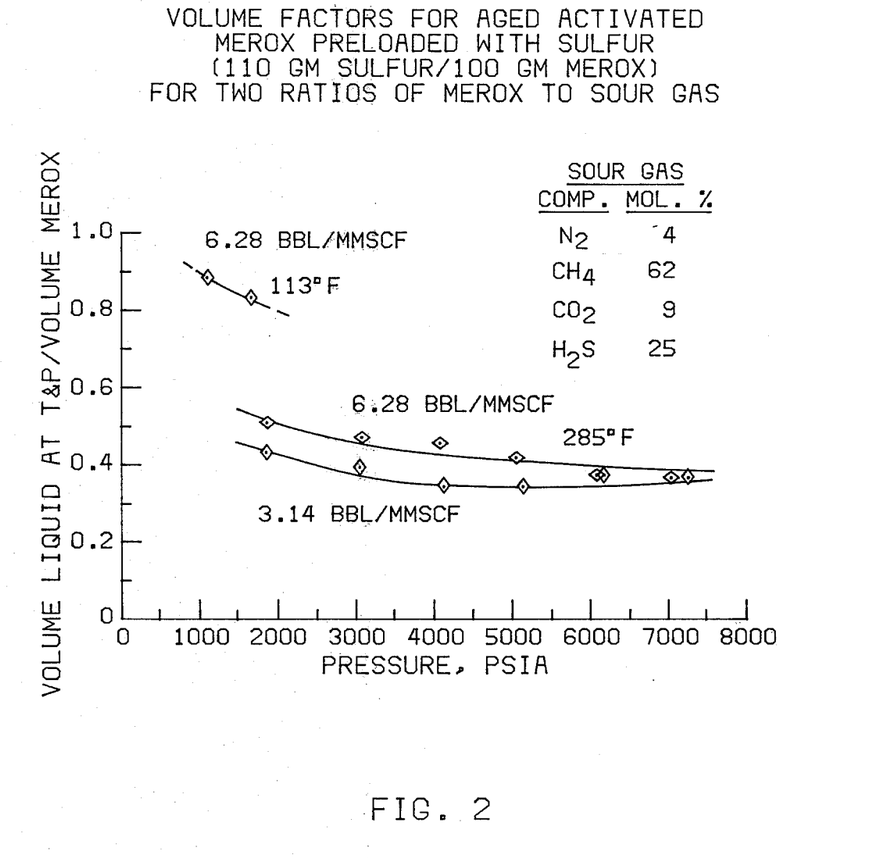
FIG. 2 of the drawing illustrates the volume factor as a function of pressure for aged activated Merox preloaded with 110 grams of sulfur per 100 grams of Merox.
Figure 3:
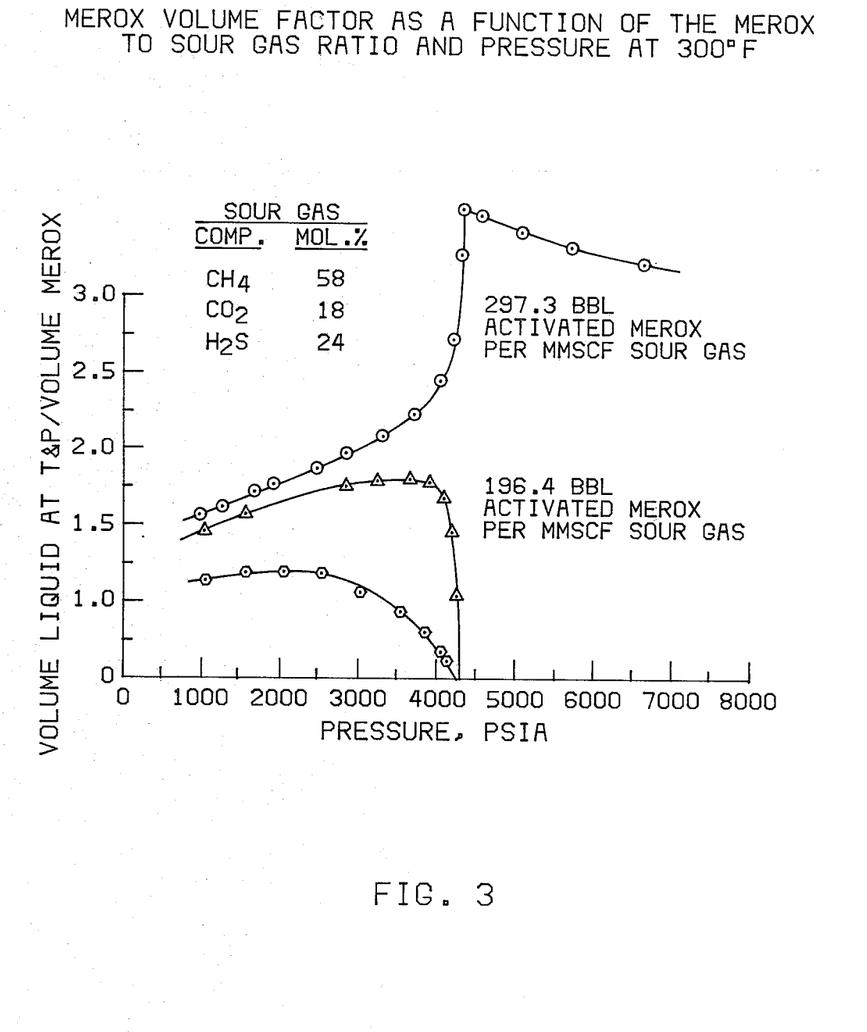
FIG. 3 of the drawing illustrates the volume factor as a function of pressure for Merox without preloaded sulfur.

In order to make the above phase distribution data of the alkyl polysulfide oils more meaningful and to place them in proper perspective relative to the prior art compositions, FIG. 3 presents phase distribution data of an amine activated Merox disulfide oil without the elemental sulfur. The format used in FIG. 3 is analogous to the previous FIG. 1 and FIG. 2, but certain distinctions were present. The tests being run in FIG. 3 were intended to simulate a sour gas well having a sour gas composition characteristic of TABLE V rather than TABLE II.

TABLE V

| Sour Gas | |
|---|---|
| Component | Mol % |
| CH₄ | 58 |
| CO₂ | 18 |
| H₂S | 24 |

Tests were performed in a manner as previously described in a windowed variable volume cell. But in this case, the tests were performed at a temperature of 300° F. (149° C.). Phase distribution data was collected at three different compositions corresponding to 297.3 barrels of activated Merox per MMSCF of sour gas, 196.4 Bbl/MMSCF and 75.6 Bbl/MMSCF. Two different sources of Merox disulfide oil were employed. The 297.3 Bbl/MMSCF test and the 75.6 Bbl/MMSCF used a Merox produced at Gulf Oil's Turner Valley Plant while the 196.4 Bbl/MMSCF test used a Merox disulfide mixture produced at Warren Petroleum's Baytown Plant. TABLE VI presents what is felt to be a typical compositional distribution of a Merox disulfide oil mixture.

TABLE VI

| Merox Disulfide Oil Composition | | |
|---|---|---|
| Component | Weight % | Mol % |
| Diethyldisulfide | 9.0 | 13.44 |
| Dipropyldisulfide | 13.3 | 16.15 |
| Dibutyldisulfide | 32.5 | 33.26 |
| Dipentyldisulfide | 33.9 | 29.97 |
| Dihexyldisulfide | 8.5 | 6.62 |
| Diheptyldisulfide | 0.85 | 0.56 |

Figure 1:
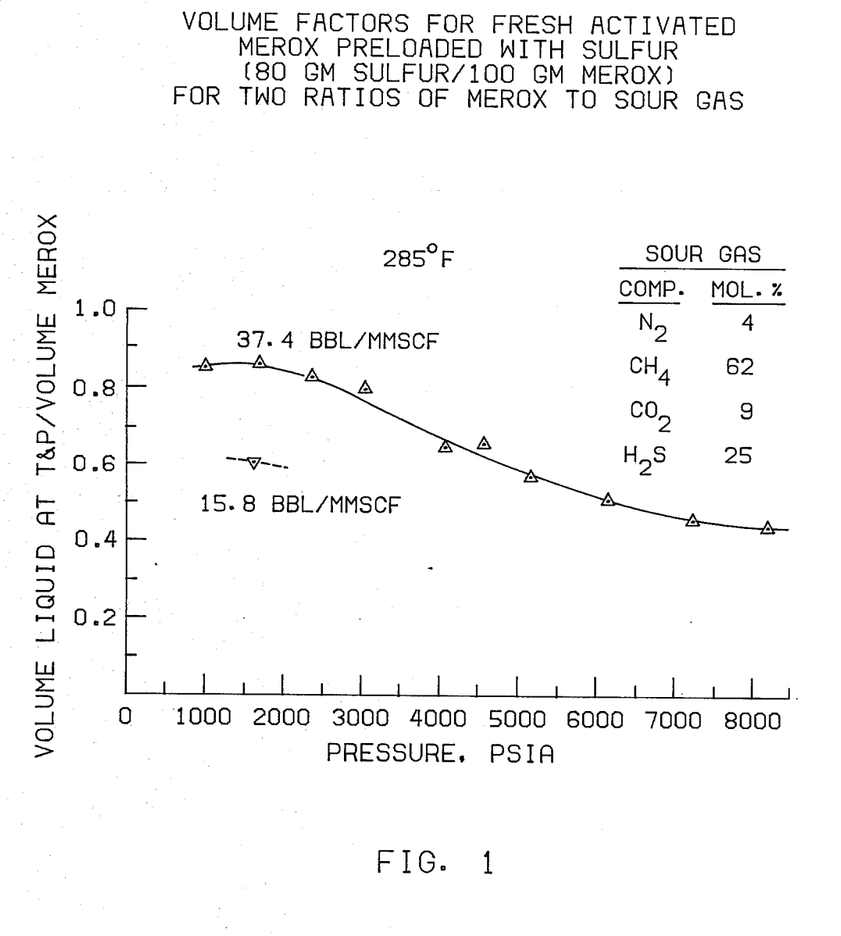
FIG. 1 of the drawing illustrates the volume factor as a function of pressure for fresh activated Merox preloaded with 80 grams of sulfur per 100 grams of Merox.

In comparing the data presented in FIG. 3 to that shown in FIG. 1 and FIG. 2, the slight difference in temperatures, sour gas compositions and source of Merox dialkyl disulfide oil are felt to be of no major significance. While the presence of the sulfur preloaded into the dialkyl disulfide oil is felt to be the cause of the drastic change in phase behavior. First looking at FIG. 3, it can readily be appreciated that at pressures in excess of approximately 4,250 psia, the presence of the liquid phase will not exist unless about 300 barrels of Merox are pumped into the well per MMSCF of gas being produced. In the absence of the liquid phase, the prevention and removal of sulfur deposits cannot be accomplished. Thus the prior art dialkyl disulfide oils, in general, will not serve as sulfur solvents in the deep hot, high pressure sour gas wells of particular interest in the present invention unless an excess of 300 barrels of solvent are injected per MMSCF of gas being produced. For all practical purposes, the injection of 300 barrels per MMSCF is impractical if not impossible.

In contrast, FIG. 1, and FIG. 2 clearly indicate the presence of liquid phase across the entire pressure range. Furthermore, the data indicate that the amount of liquid phase present at high temperature and high pressures characteristic of downhole conditions is greatly increased by the presence of the sulfur; i.e., significant liquid phase is present in FIG. 1 and FIG. 2 at much lower injected liquid to produced gas ratios than observed in FIG. 3. In view of the data, one must conclude that the addition of sulfur to the disulfide oil greatly reduced the volatility of the oil, thus resulting in the desired liquid phase even at high temperatures and high pressures.

In preparing the alkyl polysulfide oil of the present invention, the amount of sulfur preloaded into the amine activated disulfide oil should be sufficient to lower the volatility of the oil such as to guarantee the presence of a liquid phase at temperatures and pressures characteristic of a particular well. Since the present invention has its greatest utility in deep hot sour gas wells where a liquid condensate is not present, we have found that approximately 40 to 60 grams of dissolved sulfur per 100 grams of disulfide oil is sufficient in most cases. As previously indicated, 80 grams of sulfur per 100 grams of disulfide is particularly useful in that virtually no sulfur precipitation occurs at this concentration and average ambient temperatures leading to solutions that are easily transported and stored. However, concentrations in excess of this are useful, particularly at higher temperatures and pressures where even lower volatilities are necessary.

Since the compositions of the present invention achieve the desired liquid phase at very favorable low injection rates, they can be employed in a manner analogous to previous practices associated with inhibiting corrosion in gas wells wherein a condensate phase can exist at bottomhole conditions. Such methods include periodic or continuous injection of the corrosion inhibitor with or without a diluent and the like.

In addition to the presence of the liquid phase at these hostile bottomhole conditions, the alkyl polysulfide oil of the present invention inherently possesses two other advantageous properties. First, the alkyl polysulfide oil exhibits excellent film forming properties at high temperatures and pressures analogous to what has been observed in the amine activated dialkyl disulfide oils at less severe temperature and pressure conditions. This is viewed as being beneficial in suppressing corrosion in that good film forming properties results in more uniform coating of exposed steel surfaces and optimizes corrosion inhibition. Secondly, the alkyl polysulfide oil exhibits corrosion inhibition in and of itself in a manner analogous to what is known with respect to the amine activated dialkyl disulfide oil again at less severe temperature and pressure conditions. Thus, previous field experience associated with the use of a diethylamine activated Merox wherein corrosion rates of 0.0005 inches per year were measured is felt to be preserved in the alkyl polysulfide compositions. This belief is consistent with the fact that the amine activator is chemically incorporated into the alkyl polysulfide and the view that the presence of the amine is involved in the mechanism for inhibiting corrosion.

Alternately, the alkyl polysulfide oil can be used as a corrosion inhibitor carrier for deep hot gas wells in a manner analogous to what has previously been practiced in wells of lower pressures and temperatures wherein various oil condensates, diesel oil, and the like are used as carriers. Such a process involves the addition of an effective amount of a conventional oil soluble or so-called oil based corrosion inhibitor to the alkyl polysulfide oil and then injecting the mixture into the gas well to be treated. These oil soluble or oil based corrosion inhibitors include, but are not limited to, such additives as organic polar and heteropolar compounds containing nitrogen, oxygen, sulfur and/or other elements in Group V and VI which include amines, amides, mercaptans, heterocyclic nitrogen compounds, ureas, thioureas, phosphates, polyphosphates, oxyalkylates and the like. Again, the unique aspect of the use of the alkyl polysulfide oil as a corrosion inhibitor carrier involves the ability of the polysulfide to sustain a liquid film forming phase at severe hostile conditions when using very small volumes of injected fluid.

Having described the preferred embodiments, the invention is not to be construed as limited to the particular forms disclosed, since these are to be regarded as illustrative rather than restrictive. Thus, the following claims are intended to cover all the processes which do not depart from the spirit and scope of using the alkyl polysulfide oil as a corrosion inhibitor and/or carrier in deep hot gas wells.

We claim:

1. A method for inhibiting corrosion in a high temperature, high pressure gas well, characterized in that an aqueous or brine phase is present, but no petroleum condensate phase exists at bottomhole conditions, comprising the steps of:
   (a) adding up to about 27 parts by weight of an alkyl amine per 100 parts per weight of a dialkyl disulfide producing an amine activated dialkyl disulfide solvent.
   (b) adding to said activated dialkyl disulfide solvent at least about 40 parts by weight by elemental sulfur per 100 parts by weight alkyl disulfide oil producing a corrosion inhibitor carrier capable of existing in a liquid phase at bottomhole conditions at said high temperature, high pressure gas well,
   (c) injecting said corrosion inhibitor carrier into said gas well to inhibit corrosion.

2. A method for inhibiting corrosion according to claim 1 wherein an effective amount of an oil soluble corrosion inhibitor is added to said corrosion inhibitor carrier prior to injecting said corrosion inhibitor carrier into said gas well.

3. A method for inhibiting corrosion according to claim 1 or claim 2 wherein said dialkyl disulfide is a mixture of dialkyl disulfides having alkyl groups containing from about 2 to about 11 carbon atoms.

4. A method for inhibiting corrosion according to claim 3 wherein said alkyl amine is diethylamine.

5. A corrosion inhibiting composition consisting of, per 100 parts by weight of a dialkyl disulfide oil, up to about 27 parts by weight of an alkyl amine, at least about 60 parts by weight dissolved elemental sulfur, and an effective amount of an oil soluble corrosion inhibitor.

* * * * *

UNITED STATES PATENT OFFICE
CERTIFICATE OF CORRECTION

PATENT NO. : 4,295,979

DATED : October 20, 1981

INVENTOR(S) : Shelby P. Sharp and Lyman Yarborough

It is certified that error appears in the above-identified patent and that said Letters Patent are hereby corrected as shown below:

Column 7, line 21 "a" should read --at--.
Column 7, line 42, "at" should read --a--.
Column 12, line 23 "40" should read --60--.

Signed and Sealed this

Eighth Day of March 1983

[SEAL]

Attest:

Attesting Officer

GERALD J. MOSSINGHOFF

Commissioner of Patents and Trademarks